7732X
S. King,
Making Stares,
Patented Aug. 29, 1833.
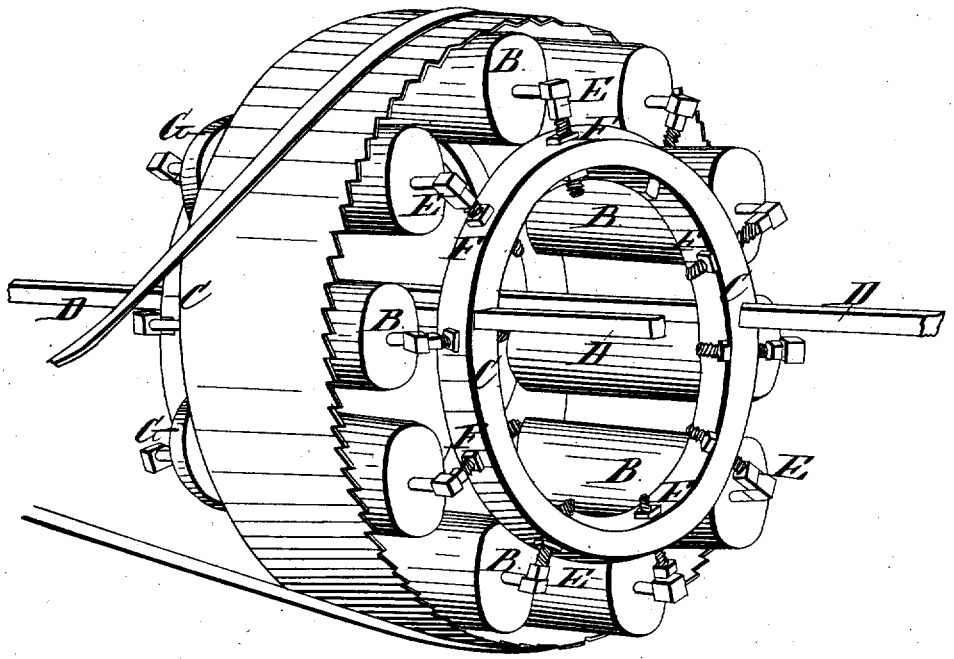
AM. PHOTO-LITHO. CO. N.Y. (OSBORNE'S PROCESS)

Sumner King of Chittenango, New York.

Letters Patent.

The schedule referred to in these Letters Patent and making part of the same containing a description in the words of the said Sumner King himself of his improvement in the saw for sawing staves and other cylindrical work, To all persons to whom these presents shall come Greeting Be it known that I Sumner King of Chittenango in the County of Madison and State of New York, have invented a new and useful improvement in a saw for sawing staves & other cylindrical work, and the following is a full and exact description of the construction and operation of the said saw as invented or improved by me The saw to be in a cylindrical form the surface of the saw to be concave, convex, or flat, for the purpose of forming the bilge, or swell in the stave, or for giving a longitudinal curve to the work, or sawing it straight as the case may require, the saw to be supported on a set of friction rollers or wheels, which are to be supported in the following manner. Two cylinders or rims made of cast iron or wood to be fastened by bars or crosspieces and at sufficient distance apart to admit the said friction rollers or wheels to play between them, the bars to run through and within the said rim and two of them to extend so far as to fasten the saw frame to any permanent part of the building or the frame upon which the whole machine rests, The cylinder or rim to have holes thro' them perpendicular to the surface to receive posts, or standards to pass through them, which are to have each a head or knob of metal or composition permanent or moveable upon said posts, or standards, with holes in them to receive the gudgeons of the said friction rollers, and upon which the said friction rollers rest, and move; The said posts or standards to have a screw head cut upon them, where they pass thro' the said cylin-ders or rims with two nuts on each for the purpose of supporting raising or lowering the posts and setting the rollers to the saw, or to have longitudinal holes in the edge of the cylinder for the purpose, and receiving bolts to run thro' them, by which the posts or standards may be made fast, by a nut or screw, or raised or lowered at pleasure, The said friction rollers may also run upon pivots, One of the said rollers, or one or more of them to be set askew or making a small angle with the other rollers at the end towards the teeth of the saw, to incline the saw back against wheels which are fixed on axles for the purpose of preventing the saw from running off from the rollers the axis of the last mentioned wheels to be fas-tened on the back cylinder with a screw in such manner as that they may be moved back and forward at pleasure The saw being fixed upon the rollers a band or strap passes round it as round a drum except a sufficient space to admit the timber that is to be sawed to pass thro' the two sides of the band, Friction rollers are placed one above and one below the carriage that carry the timber to be sawed, to keep the band close to the saw, The top roller to be fastened by arms fastened to the cylinders, the other to the frame below, The timber to be sawed to be car-ried between the sides of the band where they leave the saw, on a carriage, The band passing round the saw also, passes over a drum separate from the machine and propelled by any power; all the above mentioned wheels or rollers to be made of wood or metal or any kind of composition It will require about ten friction rollers to support a saw two feet in diameter, which is the proper size for a barrel, and for other uses in proportion, What I

17732X claim as my invention in the above described machine is the running of the saw upon the friction rollers without being attached to any block or cylinder, and also its peculiar quality of sawing staves and other work in longitudinal curves For further illustration of the same I refer to the model and drawing of the same deposited in the Patent Office In testimony whereof, I have hereunto subscribed my name at the Village of Chittenango, this tenth day of August 1833.

Witnesses
G. G. Warner
Danl. Judd

Sumner King (949 words) (Drawing made) Ex'd W.G.C.